Dec. 25, 1951  E. P. BULLARD, III., ET AL  2,579,998
LATHE CONTROL
Filed March 9, 1945  4 Sheets-Sheet 1

INVENTORS
Edward P. Bullard, III
Claude M. Grinage
BY
*Paul M. Geist*
ATTORNEY

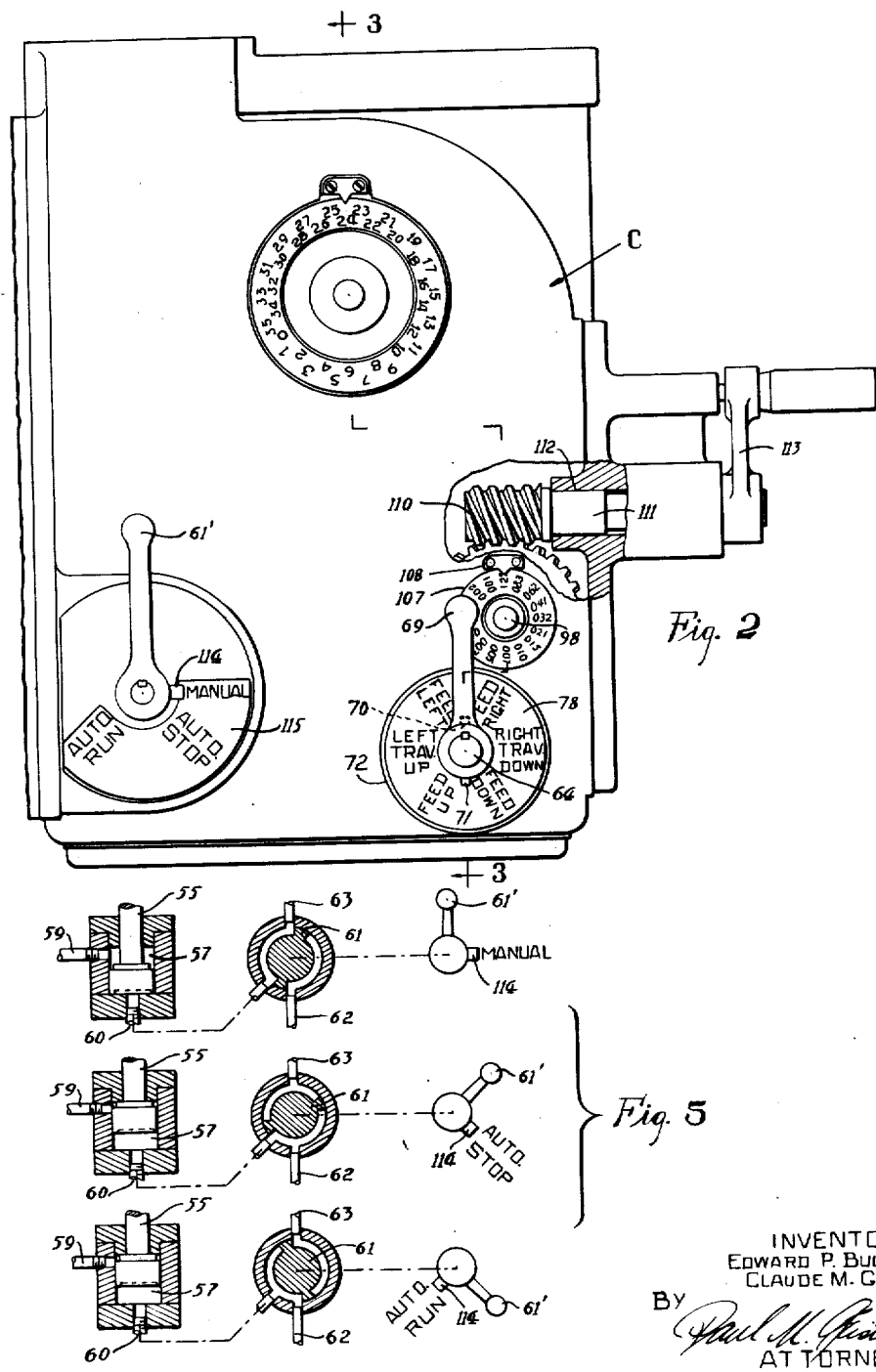

Dec. 25, 1951   E. P. BULLARD, III, ET AL   2,579,998
LATHE CONTROL
Filed March 9, 1945   4 Sheets-Sheet 3
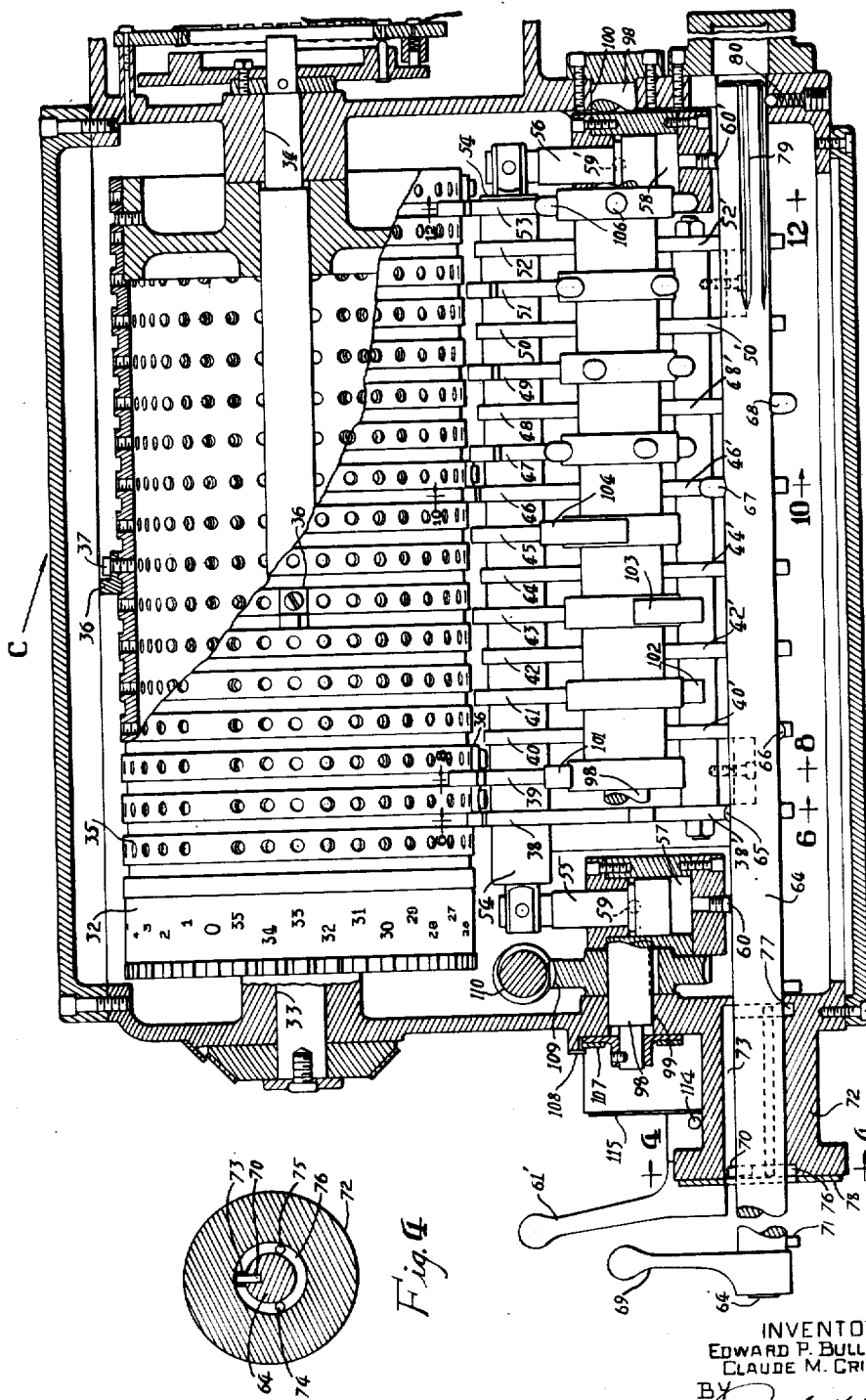
INVENTORS
EDWARD P. BULLARD, III
CLAUDE M. CRINAGE
BY
*Paul M. Gist*
ATTORNEY Dec. 25, 1951  E. P. BULLARD, III, ET AL  2,579,998
LATHE CONTROL
Filed March 9, 1945  4 Sheets-Sheet 4
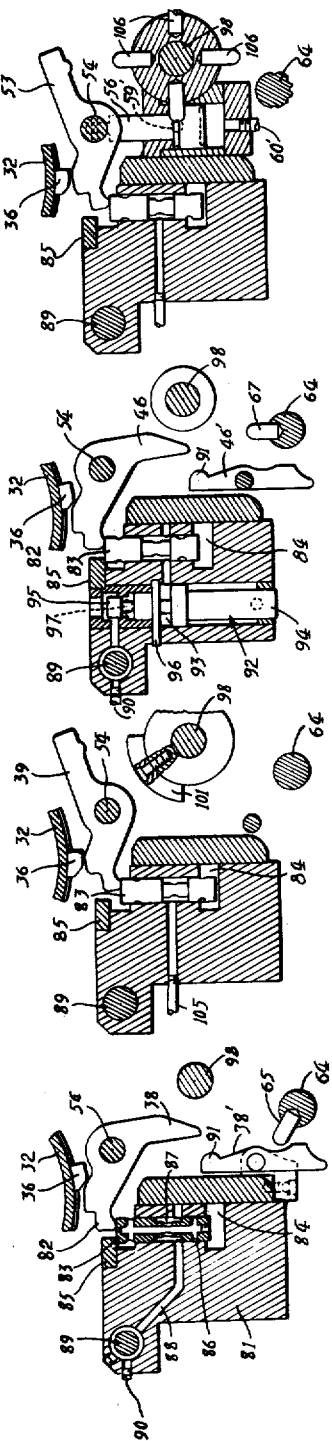
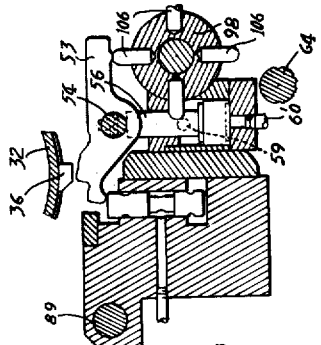
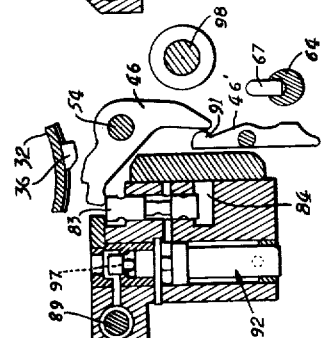
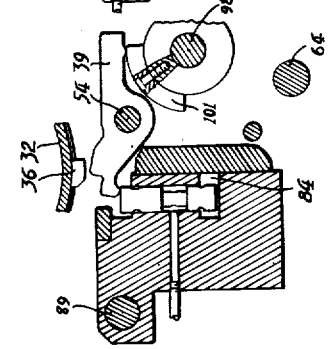
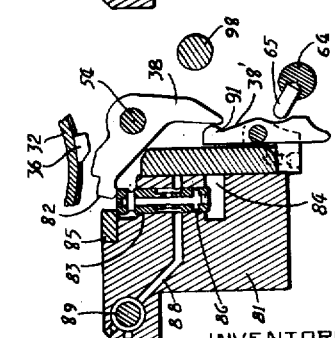
INVENTORS
EDWARD P. BULLARD, III
CLAUDE M. GRINAGE
BY
ATTORNEY Patented Dec. 25, 1951

2,579,998

UNITED STATES PATENT OFFICE 2,579,998

LATHE CONTROL

Edward P. Bullard, III, Fairfield, and Claude M. Grinage, Bridgeport, Conn., assignors to The Bullard Company, a corporation of Connecticut Application March 9, 1945, Serial No. 581,772

9 Claims. (Cl. 137—144)

This invention relates to machine tools such as lathes, and particularly to a combined manual and automatic control mechanism for operating a machine tool.

Objects of the invention include the provision of a manual control mechanism wherein as many as eight different functions of the machine tool can be initiated by a single oscillatable shaft; the provision of such a control wherein the shaft can be moved to any of its different positions from any other position and capable of readily passing through any intermediate positions; the provision of a manual control comprising a single rotatable shaft adapted to be moved to a plurality of different angular positions for operating a plurality of change gears simultaneously in different combinations to produce as many as sixteen different rates of feed movement of a machine tool head; the provision of such a feed-movement control wherein the shaft can be moved to any of its different angular positions from any other angular position and capable of readily passing through any intermediate angular positions; the provision of a control including two shafts, each adapted to be moved to different angular positions for causing a machine tool head to perform as many as eight functions and to move at as many as sixteen different feed rates; the provision of a control mechanism including three closely spaced shafts, each adapted to be moved to different angular positions for manually setting up three conditions in a machine tool, causing eight functions to be performed by a tool head and movement of the tool head at as many as sixteen different rates of feed; the provision of a control mechanism for machine tools including a plurality of valves adapted selectively to be operated both automatically and manually and in which the automatic means can be rendered effective simultaneously with rendering the manual means ineffective and vice versa; and the provision of a combined automatic and manual control embodying all of the preceding manual and automatic control features conjointly.

The above, as well as other objects and novel features of the invention will become apparent from the following specification and accompanying drawings, in which:

Figure 2 is an enlarged view of a portion of the apparatus shown in Figure 1;

Figure 3 is a sectional elevational view taken substantially along line 3—3 of Figure 2;

Figure 4 is a sectional view taken substantially along line 4—4 of Figure 3;

Figure 5 is a schematic illustration of a detail of the invention;

Figure 6 is a sectional elevation taken substantially along line 6—6 of Figure 3, showing the arrangement of one of the valves in position for automatic operation for controlling the feed movement of the tool head;

Figure 7 is a view showing the parts of Figure 6 in position for manual operation;

Figure 8 is a sectional elevational view taken substantially along line 8—8 of Figure 3 showing one of the function control valves and its tappet in position for automatic operation;

Figure 9 is a view of the parts of Figure 8 in position for manual operation;

Figure 10 is a sectional elevational view taken substantially along line 10—10 of Figure 3 showing one of the traverse valves and its tappet in position for automatic operation;

Figure 11 is a view of the parts of Figure 10 in position for manual control;

Figure 12 is a sectional elevation taken substantially along line 12—12 of Figure 3, showing another feed valve and its tappet in position for automatic operation; and Figure 13 is a view of the parts of Figure 12 in position for manual operation.

Figure 1:
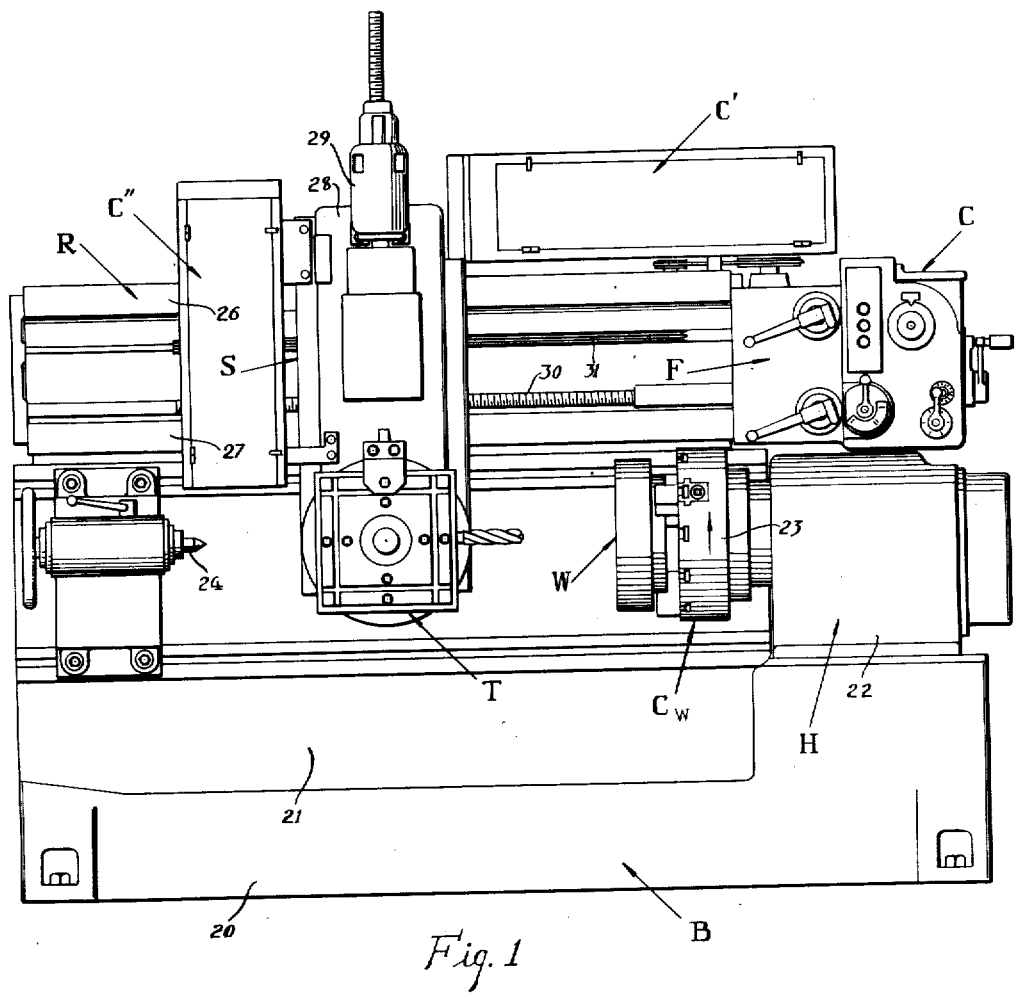
Figure 1 is a front elevational view of a lathe embodying the principles of the invention.

Referring to Figure 1 of the drawings, the invention is shown as applied to a horizontal-vertical turret lathe comprising a bed B to which is fixed at the right-hand side thereof a headstock H for imparting different rates of rotation to a work-supporting chuck $C_w$. A cross rail R is fixed to the bed B and supports a horizontally-movable saddle S. A turret T is mounted on a slide that is vertically movable on the saddle S. The turret T is located above and behind the work-supporting chuck $C_w$ and is accessible from the front of the lathe. A feedworks transmissior F includes variable-speed gearing for controlling the movement of the saddle S and the slide on which the turret is mounted and receives its power from the headstock H. A control mechanism C adjacent the feedworks F is adapted automatically to cause the feedworks F to perform every function of which it is capable. The control C also includes mechanism for permitting an operator manually to control the feedworks F to cause the turret to perform any of its functions. Supplementary control mechanism C' and C'' operates in conjunction with the control mechanism C and functions to determine when the control C is rendered effective in accordance with successive movements of the turret T along its paths of motion within a cycle of operation.

The bed B comprises a base 20 to the rear of which a vertically-disposed upright 21 is rigidly secured. The headstock H is enclosed within a housing 22 located in front of upright 21 and on the right-hand side of base 20. The headstock transmission forms no part of the present invention and may be of any form, for example similar to the variable-speed headstock transmission shown, described and claimed in application Serial Number 443,992, filed May 21, 1942, which issued on September 18, 1945, as Patent Number 2,384,809 in the name of E. P. Bullard, III, et al., to which application reference is directed for specific features of construction thereof. The headstock transmission H is adapted selectively, by automatic and manual means, to rotate chuck $C_w$ at different rates of rotation. The chuck comprises a table 23 and a horizontally-disposed spindle (not shown) that is adapted to be driven by the headstock H. The table 23 is located in a vertical plane for chucking work W horizontally, and when necessary, a removable, adjustable tailstock 24 is provided for centering long pieces of work. The cross rail R is integral with the standard 21 and includes two ways 26 and 27 that support the saddle S for horizontal sliding movement. A slide 28 mounted on saddle S supports the turret T which latter is adapted to be indexed from station to station by a motor 29. The saddle S, turret T and its indexing mechanism is substantially the same as that shown and described in the above-noted patent application Serial Number 443,992. Horizontal movement of the saddle S is caused by the rotation of a screw 30; and vertical movement of the slide 28 is caused by the rotation of a splined shaft 31. The screw 30 and the splined shaft 31 are adapted to be rotated at different rates of speed in both directions for feeding the turret T and at a relatively fast rate to traverse the said turret by the feedworks F.

With the turret T located above and behind the work-supporting chuck 23, the work can easily be chucked without interfering with the tools fixed to the turret. Furthermore, during working operations, the metal removed from the work falls away from the tools and, therefore, does not interfere with their proper functioning. Location of the headstock H and the chuck 23 on the right-hand side of the bed B with the turret above and behind the work makes it possible to rotate the chuck 23 in a counter-clockwise direction, as indicated by the arrow in Figure 1, so that the force incident to the removal of metal from the work urges the tools and the turret toward the upright 21 and still permits the use of right-handed drills, taps, reamers, etc., to be employed with the turret T for drilling, reaming and tapping the work. This combination of the turret and headstock locations has a distinct advantage over the usual left-hand location of the headstock and chuck since proper rotation of the chuck with the latter construction for forcing the tools and turret toward the frame of the machine requires the use of left-handed drills, taps and reamers. Conversely, the rotation of the chuck to permit the use of right-handed drills, etc., forces the tools and turret away from the machine frame, which is undesirable because the tools cannot adequately be supported.

The control unit C, together with the supplemental controls C' and C'' are similar to the control unit F and its supplemental control $F_d$ of application Serial Number 541,986, filed June 24, 1944, which issued on November 7, 1950, as Patent Number 2,528,736, in the name of E. P. Bullard, III. It is similar insofar as the results obtainable are concerned, but differs in specific features of construction which form the basis of part of the present invention. Inasmuch as the present invention deals with a modification of the structure of the control F of application Serial Number 541,986, specific description of the entire control mechanism is believed inadvisable and reference to said application is directed for specific features of construction not specifically shown and described herein.

Referring to Figure 3 of the drawings, the control unit C includes a function drum 32 that is mounted for rotation about horizontally-disposed bearings 33 and 34. The drum 32 includes a plurality of circumferentially-disposed tapped openings 35 that are arranged in axially-aligned rows about the drum 32. Dogs 36 are adapted selectively to be fixed to the drum 32 by screws 37 that thread into the openings 35. There is a circumferential series of holes 35 on the drum 32 for each of sixteen valves that correspond with the sixteen valves shown in Figure 39 of application Serial Number 443,992. Other rows of holes 35 are usually provided on the drum 32 for operating other parts of the lathe similar to that disclosed in said application Serial Number 443,992.

In the present invention, the sixteen valves are provided with tappets 38 to 53, inclusive. These tappets are adapted automatically to be operated as the drum 32 is indexed step by step about its horizontal axis, which indexing occurs upon the completion of the last preceding operation, all in the manner shown and described in application Serial Number 541,986. Tappets 38 to 53 are additionally adapted manually to be selectively actuated for permitting the operator to manually control the lathe. The tappets 38, 40, 42, 44, 46, 48, 50 and 52 control eight valves for providing eight different functions of the turret T including movement leftwardly, rightwardly, upwardly and downwardly at both feed and traverse rates. Tappets 39, 41, 43 and 45 are each adapted to be actuated in combination with all four of the tappets 47, 49, 51 and 53 for producing sixteen different rates of movement of the turret T in any of the four directions selected by the operation of tappets 38, 40, 42 and 44.

When the tappets 38 to 53 are adapted automatically to be operated by the function drum 32, they must not be capable of operation by the manual means; and, when it is desired to operate these tappets by the manual means, they must not be capable of being operated by the function drum 32. Accordingly, all of the tappets 38 to 53 are pivotally mounted for oscillatable movement on a common shaft 54 which is fixed at its opposite ends to pistons 55 and 56. Pistons 55 and 56 are adapted to be reciprocated within cylinders 57 and 58 which are adapted to be supplied with fluid under pressure through ducts 59, 60, 59', 60', located on opposite sides of the pistons within the cylinders 57 and 58 respectively. Referring to Figure 5, wherein a schematic arrangement of the piston 55 and its control valve is shown, the valve 61 is provided with a fluid pressure inlet 62 and an exhaust port 63. The ducts 59 and 62 leading to the cylinder 57 and valve 61 are constantly supplied with fluid under pressure, and when the valve 61 is in the position shown in the upper portion of Figure 5, the lower end of the cylinder 57 is exhausted to the port 63 whereupon the piston 55 descends. A similar action occurs in the cylinder 56 and consequently the shaft 54 descends from the position shown in Figure 6 to the position shown in Figure 7, thereby removing the tappets 38 to 52 from a position where they will cooperate with the function drum 32 to a position where they do not cooperate with said function drum. Movement of the valve 61 to the position shown in the intermediate and lower portions of Figure 5 causes the pressure fluid to pass through the line 62 to the bottom of the cylinder 57, forcing the piston 55 upwardly thereby moving the shaft 54 from the position shown in Figure 7 to the position shown in Figure 6, since the effective area of piston 55 subjected to the fluid from valve 61 is greater than the effective area of piston 55 subjected to the pressure fluid from line 59.

The present invention contemplates the provision of a single oscillatable shaft adapted to be moved to a plurality of angular positions in each of two axial positions of the shaft for operating the tappets 38, 40, 42, 44, 46, 48, 50 and 52. Referring to Figure 3, a shaft 64 is located in the lower portion of the housing for the control C. It includes tappet-operating dogs 65, 66, 67 and 68 that are adapted, with shaft 64 in its one axial position and shaft 54 in its lower position, to operate tappets 38, 40, 46 and 48 through the action of intermediate levers 38', 40', 46' and 48'; and in another axial position to operate tappets 42, 44, 50 and 52 through the action of intermediate levers 42', 44', 50' and 52'. The shaft 64 extends outwardly through the front of the housing for the control C and is provided with a hand lever 69. Referring to Figure 2, the hand lever 69 is adapted to be moved to four positions, two in each quadrant from the position shown in Figure 2. Referring to Figure 3, the shaft 64 is provided with two fingers 70 and 71 spaced apart an amount equal to the axial movement of the shaft 64. A boss 72 on the front of the housing for the control mechanism C surrounds shaft 64 and includes a keyway 73 adapted to receive the finger 70 and permit axial movement of shaft 64 only when the hand lever 69 is in its neutral or vertically-upward position. Referring to Figures 3 and 4, two rods 74 and 75 extend through the boss 72 and protrude into slots 76 and 77. The protrusions of the rods 74, 75 into the slots 76, 77 cooperate with the fingers 71 and 70 to prevent more than 180 degrees' movement of the hand lever 69. The finger 70 is located 180 degrees from the location of the finger 71. With the shaft 64 in its outer position, as shown in Figure 3, the finger 70 cooperates with the upper half of an index plate 78 (Fig. 2). Accordingly, upon movement of the hand lever 69, the finger 70 indicates the function set up within the feedworks F as shown by the index, feed left, feed right, left traverse, and right traverse. With the hand lever 69 in its vertically upward position, the shaft 64 can be axially moved so that the finger 70 moves through the keyway 73 to the rear groove 77. When this occurs, the dogs 65, 66, 67 and 68 move out of alignment with the tappets 38, 40, 46 and 48 into alignment with the tappets 42, 44, 50, 52, whereupon the hand lever 69 can be moved to the same four angular positions setting up four different functions within the feedworks F, as indicated by the finger 71 pointing to the index, down traverse, feed down, feed up and up traverse—located on the lower half of plate 78 (Fig. 2). From the foregoing it is evident that the shaft 64 can be moved to four angular positions when in each of two axial positions. In order to insure correct location of the four axial positions, four parallel grooves 79 are formed in the rear end of the shaft 64 that cooperate with a spring-pressed detent 80.

The tappets 38, 40, 42 and 44, together with their valve mechanisms are identical and, therefore, only the tappet 38 and its corresponding valve structure will be specifically described. Referring to Figure 6, a manifold 81 extends throughout the length of the housing for the control C and supports in aligned relation, the various valves that are adapted to be actuated by the various tappets. The tappet 38 is of generally inverted L-shaped construction having a head portion 82 that overlies a valve 83 located within the manifold 81. The manifold 81 includes a pressure chamber 84 common to all valves 83, the pressure fluid in which constantly reacts on the lower ends of the valves 83 forcing them upwardly into abutting relation with a ledge 85 that overlies the top of the valves 83, thereby limiting their upward movement. In Figure 6, the shaft 54 is in its upper position so that a dog 36 on the function drum 32 is adapted to operate the tappet 38 upon indexing of the drum. Upon this indexing action, the valve 83 associated with tappet 38 is forced downwardly within the manifold 81 such that pressure from chamber 84 passes through ducts 86 into the central passage of the valve 83, thence through ports 87 to duct 88 leading to a valve 89 that is located between the valves 83 and certain of he operating structure of the feedworks F. This valve 89 is the same as the valve mechanism 221 in the previously referred to application Serial Number 541,986. The fluid under pressure passes through the valve 89 to one of the shiftable clutches of the feedworks F causing a certain function of the turret T to be initiated. Upon completion of the function set up by the action of valve 83, the valve 89 is operated in the manner that the valve mechanism 221 is operated in application Serial Number 541,986, thereby exhausting the fluid from the clutch mechanism through an exhaust 90. Substantially simultaneously with the exhausting through port 90, the dog 36 on drum 32 moves in a clockwise direction away from the head 82 of the tappet 38, thereby permitting the pressure within the chamber 84 to force the valve 83 upwardly to its non-effective position.

Movement of valve 61 (Fig. 5) by its hand lever 61' to the position shown in the upper portion of Figure 5 causes the shaft 54, together with tappet 38, to move downwardly as viewed in Figure 7, so that the dog 36 on the drum 32 will clear the head 82 of the tappet 38. However, in this lowered position, the depending portion of the tappet 38 moves into cooperative position relatively to the upper head portion 81 of the lever 38'. Accordingly, oscillation of the shaft 64 will cause the dog 65 thereon to move the lever 38' in a clockwise direction, thereby causing the tappet 38 to move in a counter-clockwise direction, forcing the valve 83 downwardly causing the same function to occur that was caused by the action of tappet 38 in depressing valve 83 when operated by dog 36 on drum 32.

Referring to Figure 10, the valve 83 is identical with the valve 83 of Figure 6. However, it is combined with a time-delay mechanism 92 which is identical with, and functions the same as the time-delay mechanism shown in Figures 44, 45 and 46 of application Serial Number 443,992. Movement of the valve 83 of Figure 10 downwardly causes pressure fluid from chamber 84 to pass into the chamber 93 between the two pistons 94 and 95 that are normally urged into engagement with the pin 96. Due to the differential area of the two pistons, 94 moves downwardly throughout the extent of its travel before piston 95 moves upwardly, providing a time-delay of the movement of the piston 95. Movement of the piston 95 upwardly uncovers a pressure port 97 permitting the flow of fluid under pressure therefrom to the valve 89 and thence to a traverse clutch-shifting mechanism within the feedworks F. Referring to Figure 11, downward movement of the shaft 54 moves the tappet 46 out of cooperation with the function drum 32 such that the depending end of tappet 46 cooperates with lever 46' which is adapted manually to be operated by the action of the dog 67 upon oscillation of the shaft 64. Cooperation between dog 67 and lever 46' operates valve 83 of Figure 11 to produce the same function caused by the operation of this valve by the drum 32 as described in connection with Figure 10.

The valves 83 operated by the tappets 39, 41, 43 and 45 must be operated in combination with valves 83 for tappets 47, 49, 51 and 53. Specifically, the valve 83 for tappet 39 must be operated with each of the valves 83 for tappets 47, 49, 51 and 53, and the same goes for valves 83 for the tappets 41, 43 and 45. The present invention proposes to employ a single shaft adapted to be moved to sixteen different angular positions for operating these valves 83 in the proper combinations above described. This has been accomplished by providing a shaft 98 journaled in bearings 99 and 100 in the housing for the control C. The shaft 98 includes four quadrant cams 101, 102, 103 and 104 each of which maintains the valves 83 for tappets 39, 41, 43 and 45 effective respectively throughout succeeding 90-degree intervals of rotation of the shaft 98 when the shaft 54 is in its lower position as shown in Figure 9. Referring to Figure 8, the shaft 54 is shown in its upper position so that a dog 36 on drum 32 can cooperate with it to force the valve 83 downwardly, thereby admitting pressure fluid from the chamber 84 to a line 105 leading to one of the feed-operating clutches within the transmission F. Referring to Figure 12, the tappet 53 is adapted to be operated simultaneously with the operation of the tappet 39 to produce one of the sixteen different rates of feed travel of the turret T, all as more fully described in application Serial Number 443,992. The construction of the tappet 53 is identical with the tappet 39 and is operated by drum 32 in identically the same manner when the shaft 54 is in its upper position. However, when the shaft 54 is in its lower position as shown in Figure 13, the tappet 53 is adapted to be operated by the manual rotation of the shaft 98 once each time the cams 101, 102, 103 and 104 operate tappets 39, 41, 43 and 45. Similarly, the tappets 51, 49 and 47 are adapted to be operated once each time the cams 101, 102, 103 and 104 are effective, but at individually different times. Accordingly, there is provided a series of four dogs 106 spaced at 90-degree intervals about the shaft 98 which are adapted to actuate the tappet 53 four times during a complete revolution of the shaft 98. There is a similar series of four dogs spaced 90 degrees apart about the shaft 98 for each of the tappets 51, 49 and 47, but each series is out of phase with its adjacent series by twenty-two and one-half degrees. Accordingly, each successive twenty-two and one-half degree angular movement of the shaft 98 will successively and separately operate all of the tappets 47, 49, 51 and 53 during each quarter revolution of shaft 98; and during each said quarter revolution, one of tappets 39, 41, 43 and 45 is continuously maintained effective.

The shaft 98 extends outwardly through the one wall of the housing for the control C and has fixed to its outer extremity a dial 107 containing an index that cooperates with a stationary pointer 108 for identifying the rate of feed of the turret T for any given angular position of the shaft 98. The cams and dogs on the shaft 98 operate the respective tappets for forcing the various valves 83 against the action of the pressure fluid in chamber 84. Inasmuch as two of these tappets must simultaneously be operated each time a new feed is selected, a substantial force is required to turn the shaft 98. Therefore, a gear 109 is fixed to the shaft 98 inside the housing for the control C and meshes with a worm 110 integral with a shaft 111 journaled in a bearing 112 formed in the one side of the housing for the control C. The shaft 111 has fixed to it a crank 113 so that rotation of the crank causes rotation of the shaft 98. The construction and arrangement of the parts are such that a rotation of the crank 113 causes shaft 98 to move through twenty-two and one-half degrees, or the distance between successive numerals on the dial 107.

Referring to Figure 2, the hand lever 61' includes a pointer 114 which cooperates with a plate 115 containing three identifying indices, namely, manual, automatic stop and automatic run. With the hand lever 61' in the position shown in Figure 2, the apparatus is set for manual control such that the shaft 54 is in its lower position and the tappets 38 and 53 have been moved out of cooperative position relatively to the function drum 32 and into cooperative position with regard to the manually-controlled mechanism including lever 69 and crank 113. Movement of the hand lever 61' so that pointer 114 is adjacent "auto stop" (see also Fig. 5) causes the shaft 54 to be moved to its upper position so that the tappets 38 to 53 are in cooperative position relatively to the function drum 32. With the apparatus set for automatic stop, the function being performed at the time such setting is made is completed and the apparatus is stopped at the end thereof in the same manner, and by the same means as shown and described in application Serial Number 541,986. With the hand lever 61' in the position shown in the lower portion of Figure 5, the apparatus is set for "auto run" and the shaft 54, together with the tappets 38 to 53 are still maintained in their upper position in cooperative relation relatively to the function drum 32. With the apparatus in the "auto run" condition, it successively performs the functions pre-set on the function drum 32 by the same means, and in the same manner as disclosed in application Serial Number 541,986.

Although the various features of the improved control mechanism have been shown and described in detail to fully disclose one embodiment of the invention, it will be evident that numerous changes can be made in such details and certain features can be used without others without departing from the principles of the invention.

What is claimed is:

1. Control apparatus for a machine tool including a plurality of fluid-control valves adapted selectively to be operated; control means; removable means adapted to be set at different positions about said control means; means for successively rendering said removable means effective; separate means for rendering said removable means effective and ineffective; a single oscillatable shaft, adapted, when said removable means is rendered ineffective by said separate means, to be moved in one direction to a plurality of angular positions from a neutral position for operating and releasing certain of said valves, to be moved in another direction to a plurality of angular positions from said neutral position for operating and releasing certain other of said valves; and means providing for axial movement of said shaft so that its movement to said angular positions operates other valves.

2. Control apparatus for a machine tool including a plurality of fluid-control valves adapted selectively to be operated; control means; removable means adapted to be set at different positions about said control means; means for successively rendering said removable means effective; separate means for rendering said removable means effective and ineffective; a separate tappet for each valve; a single oscillatable shaft, including tappet-operating means adapted, when said removable means is rendered ineffective by said separate means, to be moved in one direction to a plurality of angular positions from a neutral position for operating and releasing certain of said tappets, to be moved in another direction to a plurality of angular positions from said neutral position for operating and releasing certain other of said tappets; and means providing for axial movement of said shaft so that said tappet-operating means is moved out of cooperating position relatively to said certain tappets and into cooperating position relatively to other of said tappets.

3. Control apparatus for a machine tool including a plurality of fluid-control valves adapted selectively to be operated; a single oscillatable shaft adapted to be moved to a plurality of different angular positions for operating and releasing certain of said valves; means providing for axial movement of said shaft so that certain other of said valves are adapted to be operated when said shaft is moved to said different angular positions; another shaft adapted to be moved to a number of angular positions equal to the number of possible combinations procurable with certain of said valves; and means on said other shaft for continuously operating certain of said valves while others that are to be operated in combination therewith are individually operated.

4. Control apparatus for a machine tool including a plurality of fluid-control valves adapted selectively to be operated; a separate tappet for each valve; a single oscillatable shaft, including tappet-operating means adapted to be moved in one direction to a plurality of angular positions from a neutral position for operating and releasing certain of said tappets, to be moved in another direction to a plurality of angular positions from said neutral position for operating and releasing certain other of said tappets; means providing for axial movement of said shaft so that said tappet-operating means is moved out of cooperating position relatively to said certain tappets and into cooperating position relatively to other of said tappets; another shaft adapted to be moved to a number of angular positions equal to the number of possible combinations procurable with certain of said valves; and means procurable with certain of said valves; and means on said other shaft for continuously operating certain of said valves while others that are to be operated in combination therewith are individually operated.

5. In a control mechanism for a machine tool, a plurality of fluid-control valves adapted selectively to be operated individually and a plurality of fluid-control valves adapted to be operated in various combinations; a function-selecting means adapted to be pre-set on said selecting means to operate any of said valves at any station to which said selecting means is indexed; an oscillatable shaft adapted to be moved to a plurality of angular positions for operating and releasing certain of said valves; means providing for axial movement of said shaft so that certain other of said valves are adapted to be actuated when said shaft is moved to said different angular positions; a second shaft adapted to be moved to a number of angular positions equal to the number of possible combinations procurable with those valves that are adapted to be operated in combination; means on said second shaft for continuously operating certain of said valves while others that are adapted to be operated in combination therewith are individually operated; and means for causing said valves to cooperate with said function-selecting means and be free from cooperation with said shaft, or to cooperate with said shafts and be free from cooperation with said function-selecting means.

6. In a control mechanism for a machine tool, a plurality of fluid-control valves adapted selectively to be operated individually and a plurality of fluid-control valves adapted to be operated in various combinations; a function-selecting means adapted to be pre-set; a separate tappet for each of said valves; means adapted to be pre-set on said selecting means for operating any of said valve tappets at any station to which said selecting means is indexed; an oscillatable shaft, including tappet-operating means adapted to be moved in one direction to a plurality of angular positions from a neutral position for operating and releasing certain of said tappets, to be moved in another direction to a plurality of angular positions from said neutral position for operating and releasing certain other of said tappets; means for axially moving said shaft so that said tappet-operating means is moved out of cooperating position relatively to said certain tappets and into cooperating position relatively to other of said tappets; a second shaft adapted to be moved to a number of angular positions equal to the number of possible combinations procurable with those valves that are adapted to be operated in combination; means on said second shaft for continuously operating certain of said valves while others that are to be operated in combination therewith are individualy operated; and means for bodily moving all of said tappets from a position where they cooperate with said function-selecting means and be free from cooperation with said shafts, or to a position where they cooperate with said shafts and be free from cooperation with said function-selecting means.

7. Control apparatus for a machine tool including sixteen fluid-control valves certain of which are adapted selectively to be operated individually and others are adapted to be operated in combination; a separate tappet for each valve; an oscillatable shaft including tappet-operating means for four of said valves, said tappet-operating means being angularly disposed about the periphery of said shaft so that movement of said shaft to four different angular positions will operate four of said tappets individually; means providing for axial movement of said shaft so that said tappet-operating means is moved out of cooperating position relatively to said four tappets and into cooperating position relatively to four other of said tappets; another shaft adapted to be moved to at least sixteen different angular positions; and means on said other shaft for operating four other of said tappets in combination with each of the four remaining tappets.

8. Control apparatus for a machine tool including a plurality of fluid-control valves; means adapted to be pre-set for selectively operating said valves; manually-operable means including two shafts adapted to be moved to different angular positions for operating said valves; and a third shaft adapted to be moved to an angular position for causing said pre-settable means to become effective, to another angular position for causing said manually-operable means to become effective and to a third angular position for causing said control apparatus to stop upon the completion of an operation within a cycle of operations.

9. Control apparatus for a machine tool including sixteen fluid-control valves; means adapted to be pre-set for selectively operating said valves; a shaft adapted to be moved to 30 different angular positions for operating eight different valves for producing eight different functions; another shaft adapted to be moved to different angular positions for operating each of four of said valves in combination with four others to produce sixteen different functions; and a third shaft adapted to be moved to one angular position for causing said pre-settable means to become effective, to another angular position for causing said two shafts to become effective and to a third angular position for causing said control apparatus to stop upon completion of an operation within a cycle of operations.

EDWARD P. BULLARD, III.
CLAUDE M. GRINAGE.

REFERENCES CITED

The following references are of record in the file of this patent:

UNITED STATES PATENTS

| Number | Name | Date |
|---|---|---|
| 1,663,557 | Kennedy | Mar. 27, 1928 |
| 1,874,266 | Ferris | Aug. 30, 1932 |
| 2,137,222 | Barr | Nov. 22, 1938 |
| 2,180,035 | Cleghorn | Nov. 14, 1939 |
| 2,222,206 | Stone et al. | Nov. 19, 1940 |
| 2,289,957 | Godriaux | July 14, 1942 |
| 2,311,394 | Hunt | Feb. 16, 1943 |
| 2,352,183 | Bullard | June 27, 1944 |
| 2,384,809 | Bullard | Sept. 18, 1945 |

FOREIGN PATENTS

| Number | Country | Date |
|---|---|---|
| 673,823 | Germany | Mar. 29, 1939 |

---

Certificate of Correction

Patent No. 2,579,998            December 25, 1951

EDWARD P. BULLARD, III, ET AL.

It is hereby certified that error appears in the printed specification of the above numbered patent requiring correction as follows:

Column 10, line 11, after "pre-set" insert the semi-colon and words ; *means adapted to be pre-set*; line 30, for "shaft" read *shafts*;

and that the said Letters Patent should be read as corrected above, so that the same may conform to the record of the case in the Patent Office.

Signed and sealed this 25th day of March, A. D. 1952.

[SEAL]

THOMAS F. MURPHY,
*Assistant Commissioner of Patents.* periphery of said shaft so that movement of said shaft to four different angular positions will operate four of said tappets individually; means providing for axial movement of said shaft so that said tappet-operating means is moved out of cooperating position relatively to said four tappets and into cooperating position relatively to four other of said tappets; another shaft adapted to be moved to at least sixteen different angular positions; and means on said other shaft for operating four other of said tappets in combination with each of the four remaining tappets.

8. Control apparatus for a machine tool including a plurality of fluid-control valves; means adapted to be pre-set for selectively operating said valves; manually-operable means including two shafts adapted to be moved to different angular positions for operating said valves; and a third shaft adapted to be moved to an angular position for causing said pre-settable means to become effective, to another angular position for causing said manually-operable means to become effective and to a third angular position for causing said control apparatus to stop upon the completion of an operation within a cycle of operations.

9. Control apparatus for a machine tool including sixteen fluid-control valves; means adapted to be pre-set for selectively operating said valves; a shaft adapted to be moved to 30 different angular positions for operating eight different valves for producing eight different functions; another shaft adapted to be moved to different angular positions for operating each of four of said valves in combination with four others to produce sixteen different functions; and a third shaft adapted to be moved to one angular position for causing said pre-settable means to become effective, to another angular position for causing said two shafts to become effective and to a third angular position for causing said control apparatus to stop upon completion of an operation within a cycle of operations.

EDWARD P. BULLARD, III.
CLAUDE M. GRINAGE.

REFERENCES CITED

The following references are of record in the file of this patent:

UNITED STATES PATENTS

| Number | Name | Date |
|---|---|---|
| 1,663,557 | Kennedy | Mar. 27, 1928 |
| 1,874,266 | Ferris | Aug. 30, 1932 |
| 2,137,222 | Barr | Nov. 22, 1938 |
| 2,180,035 | Cleghorn | Nov. 14, 1939 |
| 2,222,206 | Stone et al. | Nov. 19, 1940 |
| 2,289,957 | Godriaux | July 14, 1942 |
| 2,311,394 | Hunt | Feb. 16, 1943 |
| 2,352,183 | Bullard | June 27, 1944 |
| 2,384,809 | Bullard | Sept. 18, 1945 |

FOREIGN PATENTS

| Number | Country | Date |
|---|---|---|
| 673,823 | Germany | Mar. 29, 1939 |

---

Certificate of Correction

Patent No. 2,579,998      December 25, 1951

EDWARD P. BULLARD, III, ET AL.

It is hereby certified that error appears in the printed specification of the above numbered patent requiring correction as follows:

Column 10, line 11, after "pre-set" insert the semi-colon and words *; means adapted to be pre-set*; line 30, for "shaft" read *shafts*;

and that the said Letters Patent should be read as corrected above, so that the same may conform to the record of the case in the Patent Office.

Signed and sealed this 25th day of March, A. D. 1952.

[SEAL]

THOMAS F. MURPHY,
*Assistant Commissioner of Patents.*

Certificate of Correction

Patent No. 2,579,998                                                          December 25, 1951

EDWARD P. BULLARD, III, ET AL.

It is hereby certified that error appears in the printed specification of the above numbered patent requiring correction as follows:

Column 10, line 11, after "pre-set" insert the semi-colon and words *; means adapted to be pre-set*; line 30, for "shaft" read *shafts*;

and that the said Letters Patent should be read as corrected above, so that the same may conform to the record of the case in the Patent Office.

Signed and sealed this 25th day of March, A. D. 1952.

[SEAL]

THOMAS F. MURPHY,
*Assistant Commissioner of Patents.*